United States Patent [19]

Littlejohn et al.

[11] Patent Number: 4,581,533

[45] Date of Patent: Apr. 8, 1986

[54] MASS SPECTROMETER AND METHOD

[75] Inventors: Duane P. Littlejohn; Sahba Ghaderi, both of Madison, Wis.

[73] Assignee: Nicolet Instrument Corporation, Madison, Wis.

[21] Appl. No.: 610,502

[22] Filed: May 15, 1984

[51] Int. Cl.[4] .......................... H01J 49/00; B01D 59/44

[52] U.S. Cl. .......................... 250/282; 250/291

[58] Field of Search .......................... 250/290, 291, 282

[56] References Cited

U.S. PATENT DOCUMENTS

| | | | |
|---|---|---|---|
| 2,633,539 | 3/1953 | Altar | 250/290 |
| 3,390,265 | 6/1968 | Llewellyn | 250/290 |
| 3,937,955 | 2/1976 | Comisarow et al. | 250/291 |

*Primary Examiner*—Bruce C. Anderson

*Attorney, Agent, or Firm*—Kinney & Lange

[57] ABSTRACT

A mass spectrometer including a vacuum chamber wherein molecular flow conditions are maintained. A sample introduced into the chamber is ionized while a magnetic field through the chamber induces ion cyclotron resonance. Trapping plates are provided for restricting ion movement along the magnetic field while a conductance limit plate divides the chamber into first and second compartments. The conductance limit plate has an orifice configured to allow ion equilibration between the compartments while maintaining a pressure differential between them. The conductance limit plate includes an electrode that is selectively connected to a means for applying trapping potential to selectively trap ions in one of said compartments.

17 Claims, 4 Drawing Figures

MASS SPECTROMETER AND METHOD

BACKGROUND OF THE INVENTION

1. Field of the Invention

Ion cyclotron resonance (ICR) is a known phenomena and has been employed in the context of mass spectroscopy. Essentially, this mass spectrometer technique has involved the formation of ions and their confinement within a cell for excitation. Ion excitation may then be detected for spectral evaluation.

With the advent of Fourier Transform mass spectroscopy, rapid and accurate mass spectroscopy became possible. This technique is disclosed in U.S. Pat. No. 3,937,955 issued Feb. 10, 1976 to Comisarow and Marshall, which is commonly owned with the present invention and which is hereby incorporated by reference. While this technique provided a vast improvement over the earlier ICR instruments, problems of sensitivity, resolution and exact mass measurement remained. Earlier attempts to resolve these problems have centered around the design of the ion analyzer cell.

The development of ion analyzer cells can be traced from the drift cell disclosed in U.S. Pat. No. 3,390,265 and the trapped ion cell of U.S. Pat. No. 3,742,212. In the latter, six solid metallic plates are used as electrodes with two plates perpendicular to the magnetic field within the spectrometer and the remaining four plates parallel to that magnetic field. The perpendicular plates were charged to a given dc potential while the remaining plates were charged at an opposite potential equal in magnitude to that applied to the perpendicular plates. In the improvement of the incorporated specification, the two perpendicular plates, commonly referred to as trapping plates, were charged to a given dc potential with the remaining plates charged to a lesser potential that was not necessarily opposite in charge.

An improvement over the above cells is discussed by Comisarow in *International Journal of Mass Spectrometry and Ion Physics* 37(1981)251-257. This improved Comisarow cell is a cubic design of six stainless steel plates enclosing a volume of $(2.54\ cm)^3$. A dc voltage is applied to the trapping plates (those perpendicular to the magnetic field) while the remaining four plates are kept at ground potential. The article states that this cell has a higher resolution by a factor of four as well as greater convenience in operation and greater reliability.

A modification of a cubic cell is described by Hunter et al. in *International Journal of Mass Spectrometry and Ion Physics* 50 (1983) 259-74. This cell is similar to the cubic cell in that only the trapping plates (the plates perpendicular to the magnetic field) and charged while the remaining plates are kept at ground potential. However, this cell is elongated in the direction along the magnetic field.

SUMMARY OF THE INVENTION

The present invention relates to a mass spectrometer vacuum chamber, and, specifically, to a multi-section cell within such chamber which may maintain differential pressures between the cell sections. A conductance limit divides the spectrometer vacuum chamber into compartments and, accordingly defines the bounds between the cell sections. The conductance limit includes an electrode having the conductance limiting orifice at the center line of the magnetic flux. The flux may be established within the spectrometer in any known manner. Multiple pumps establish and maintain molecular flow conditions in each of the vacuum chamber compartments while the orifice is configured to allow ion equilibriation between the compartments and cell sections while maintaining the pressure differential between the compartments resulting from sample introduction. Thus, a sample may be introduced in a first cell section to be ionized in that section. Sample introduction results in an increase in pressure in the cell section in which the sample is introduced. Within limits, introduction of a larger sample enhances ion formation. It also produces greater pressure increases.

After ion formation, the ions will equilibrate through the orifice to a second cell section, due to the B (magnetic) axis components of velocity resulting from the thermal energies of the neutral molecules, wherein they may be excited and detected. However, the conductance limit will maintain the differential pressure between cell sections thus largely preventing a flow of neutral molecules from one section to another. Ion equilibration is established by restricting B axis ion flow with conventional trapping plates, one trapping plate defining the outer bound of each cell section. After equilibration, a dc trapping potential is applied to the electrode of the conductance limit. This dc potential is of the same magnitude and polarity as is applied to the trapping plates. By this trapping procedure two separate analyzer cells are created with each containing a geometric proportion of the equilibrated ion beam. Thus, following equilibration and trapping, ions are contained in the second, low pressure, cell section wherein the number of neutral molecules is significantly less than the number of neutral molecules in the first, high pressure cell section. As will be apparent to those familiar with the art, ion formation in the high pressure cell section enhances ionization while maintenance of those ions in a low pressure section that is relatively free of neutral ions extends the transient decay and, hence, the observation time of those ions. In the prior art single section cell, ion formation and detection occured in the same section which resulted in a compromise between the number of ions formed and the duration of their transient decay.

BRIEF DESCRIPTION OF THE DRAWINGS

Referring now to FIG. 1, there is illustrated a preferred embodiment of the multi-section sample cell in accordance with the present invention. The sample cell is intended for use within a mass spectrometer of the type wherein a magnetic field is generated, the direction of the magnetic flux being indicated by the arrow B in FIG. 1. Perpendicular to the magnetic field are trapping plates 10 and 11 which are connected to a trapping potential control 12. Trapping potential control 12 selectively applies trapping potential to the plates 10 and 11 and to an electrode 13 to be described more fully below. Trapping potentials of appropriate polarity and magnitude may be provided by the trapping potential control 12.

Figure 1:
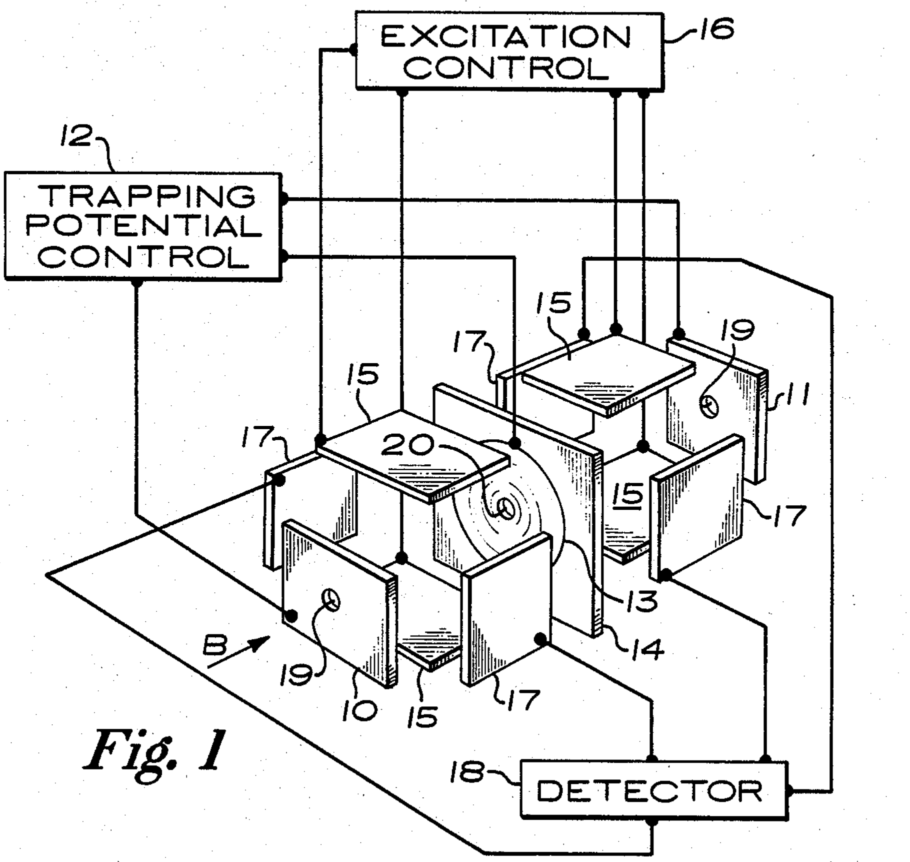
FIG. 1 is an exploded and partial cutaway view illustrating a sample cell divided into multiple sections by a conductance plate, in accordance with the present invention.

Electrode 13 includes the conductance limit orifice 20 and is supported by an electrically isolated conductance limit plate 14 which divides the cell of the present invention into first and second sections. As will be described more fully below, the conductance limit plate 14 also divides the spectrometer vacuum chamber into first and second compartments allowing separate pressure maintenance in each. If detection is to occur in each of the cell sections, those sections are provided with a pair of excitation plates 15 that are connected to an excitation control 16. Similarly, each cell section in which detection is to occur is provided with a pair of detector plates 17 connected to detector circuitry 18. Apertures 19 within the trapping plates 10 and 11 allow passage of an ionization beam, in known manner. Similarly, an orifice 20 in the electrode 13 of conductance limit plate 14 allows passage of an ionization beam. As will be described more fully below, the orifice 20 also permits equilibration of ions formed in one of the cell sections between both of the cell sections. Various controls and detectors together with the plates 10, 11, 15 and 17 may be in accordance with corresponding structures known to the prior art.

Figure 2:
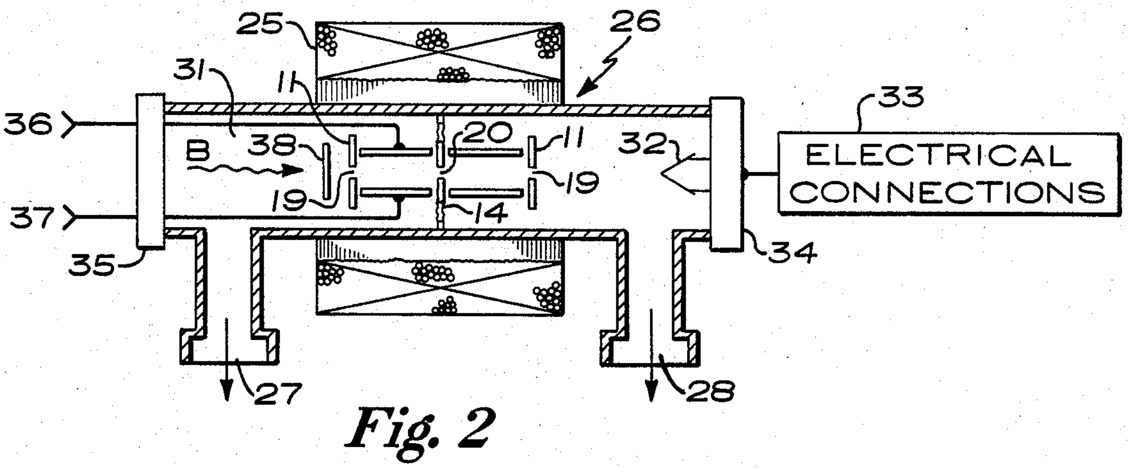
FIG. 2 is a diagrammatic illustration of a vacuum chamber and magnet of a mass spectrometer in accordance with the present invention.

FIG. 2 is a diagramatic illustration of a portion of a mass spectrometer in accordance with the present invention. A magnet 25 encircles the spectrometer vacuum chamber designated generally at 26 to induce a magnetic field in the direction indicated by the arrow B in FIG. 2. A conductance limit plate 14 divides the vacuum chamber into first and second compartments, 30 and 31, with each compartment being connected to an independent pump indicated generally by the arrows 27 and 28. The pumps are ultra high vacuum pumping systems of a type known to the prior art and may be high performance diffusion pumps, turbo molecular cryogenic, ion pumps, etc. Typically, the pressure to which each vacuum chamber compartment is pumped is in the low $10^{-9}$ torr region. Within the context of the present invention, it is important that each of the pumps establish and maintain molecular flow conditions within each of the vacuum chamber compartments 30 and 31.

The vacuum chamber 30, which is evacuated by the pump indicated at 28, contains an electron gun 32 which will emit a beam of electrons to pass through the apertures 19 of the trapping plates 10 and 11 and the orifice 20 of conductance limit plate 14 to ionize a sample contained in either of the sample cell sections. The electrical connections 33 typically extend through a single end flange 34 to all electrical components in both of the compartments 30 and 31. Similarly, substances such as samples and reagent gases may be introduced through a second end flange 35 as indicated generally at 36 and 37 and may be carried by appropriate plumbing into the ionizing region. That region may also contain an electron collector 38, in known manner. The electrical connections and substance introduction systems are well known and form no part of the present invention beyond their utilization within the context of a mass spectrometer.

In operation, and with the proper pressure and temperature conditions established, in known manner, a sample to be analyzed is introduced into the left-most section of the sample cell contained within chamber 31, as illustrated in FIG. 2. In the illustrated embodiment, ions are then formed within that sample cell section via, for example, electron impact which is also well known. It should be noted that sample introduction results in a higher pressure within that sample cell section in which the sample is introduced. However, the orifice 20 of the conductance limit plate 14 is sufficiently small such that a pressure differential between the two vacuum chamber compartments will be maintained so long as pressure in both compartments remains in the molecular flow region and the pumping speed of the pumps are higher than the conductance of the vacuum chamber. Typically, pressure will increase as a result of sample introduction from the noted low $10^{-9}$ torr region to between approximately $10^{-8}$ and $10^{-4}$ torr. However, by proper selection of the size of the orifice 20, the pressure in the vacuum chamber compartment 30 remains relatively unaffected. For many applications, the orifice may be circular in cross section having a diameter of approximately 4 mm. For comparison purposes, the electron beam diameter is typically on the order of 1–2 mm.

With ions formed within the sample cell section within the vacuum chamber compartment 31, and in the presence of a magnetic field, ion cyclotron resonance will be established, in known manner. By the proper application of a dc potential to the trapping plates 10 and 11, those plates will restrict ion movement to the region between them along the magnetic field. At this point in time, no potential is applied to electrode 13 of conductance limit plate 14 (see FIG. 1) so that electrode 13 does not restrict ion movement. The other electrodes discussed with reference to FIG. 1 may be essentially neutral or slightly polarized. The particular polarity applied to the trapping plates 10 and 11 is dependent on the polarity of the ions being investigated, in known manner.

With ion cyclotron resonance established and the orifice 20 properly positioned and configured so as to maintain a pressure differential while allowing passage of ions along the magnetic field, ions will equilibrate in a relatively short time due to their thermal energy and the applied trapping potential. That is, the ions undergo an oscillation parallel to the magnetic field flux with the frequency of that oscillation being dependent on the trapping voltage and mass. Thus, the trapping potential applied to the trapping plates 10 and 11 can be used to restrict the ion movement to locations between the trapping plates while causing those ions to equilibrate between the two cell sections. Equilibration is typically achieved in a very short time—less than 1 ms. However, while ion equilibration is accomplished the differential pressure between the two vacuum chamber compartments is maintained thus resulting in an enrichment in ion concentration in the sample cell section contained in vacuum chamber compartment 30 without a corresponding increase of neutral molecules. This ion enrichment without corresponding increase in neutral molecules greatly increases the duration of the transient decay of the ions. In single section cells, an increase in the number of ions to achieve better signal to noise ratio requires an increase in the neutral molecule pressure which limits resolution and sensitivity as well as exact mass measurement due to the damping of the transient decay as a result of collisions between the ions and the neutral molecules.

The above discussion is focused on ion formation in one section of a multiple section sample cell and enrichment of the ion concentration in another section of that sample cell without a corresponding increase in neutral molecules in the second cell section. Of course, other operations are necessary within a mass spectrometer, including establishment of proper magnetic, temperature and pressure conditions. Additionally, ion excitation and detection are necessary to complete the analysis. Such excitation, as by a radio frequency signal, and detection may be as known to the prior art in the practice of Fourier Transform or ICR mass spectrometry. Also, other operational steps, such as quenching between analyses may be employed in the context of the present invention. Ion quenching may be achieved by applying a relatively high and opposite polarity potential to the trapping plates and the electrode 13 (see FIG. 1) that forms a part of the conduction limit. It has been found that this creates a potential gradient within the cell that is enough to remove the ions from both sections of the cell assembly and to establish proper initial conditions within the cell sections for new ion formation/detection.

Figure 4:
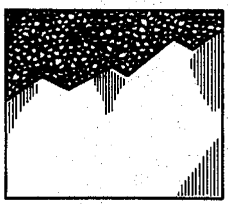
FIG. 4 illustrates a perforated plate that may be employed within the multi-section sample cell, in accordance with the present invention.
Figure 3:
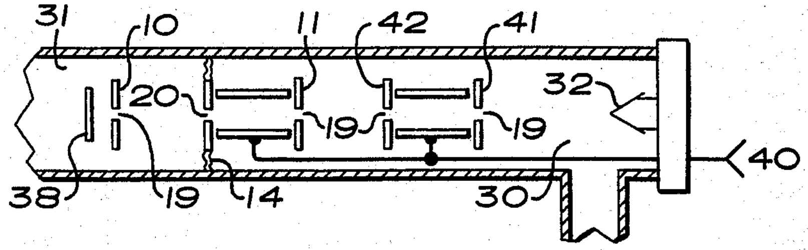
FIG. 3 is an alternative configuration to the vacuum chamber of FIG. 2, although in accordance with the present invention.

Obviously, many modifications and variations of the present invention are possible in light of the above teachings. From the teachings above it is apparent that a plurality of analyzer cell sections can be placed along the center of magnetic flux and, with appropriate trapping, share geometrically the common ion beam passing therethrough allowing independent experimental analysis on each fraction of the same ion population. Also, FIG. 3 illustrates an alternative multiple section cell and an additional cell in accordance with the present invention. In FIG. 3, the cell section within vacuum chamber 31 is formed by a trapping plate 10 only. If no ion detection is to occur within compartment 31, no excitation or detecting plates are required in that compartment. An electron collector 40 is shown behind the aperture 19 to collect electron emitted by the electron gun 32. The sample cell section in vacuum chamber compartment 30 is immediately on the other side of the conductance limit plate 14 from compartment 31 and may be as described with reference to FIG. 2. Alternatively, provision may be made for substance introduction into the sample cell sections within compartment 30, as by a line 40, for reasons that are apparent to those familiar with the art. It should be noted that the present invention provides or improves mass spectrometry/mass spectrometry and chemical induced decomposition experiments in mass spectrometers as well as gas chromatography/mass spectrometry and analysis of samples introduced by a solids probe. An auxiliary cell may be employed, as illustrated in the compartment 30 of FIG. 3 which is positioned in the lower field portion of the magnetic field which allows lower mass detection. This cell may be formed as a single section cell. Also, any known ionization technique may be used in accordance with the present invention. Positioning of the electron gun in that vacuum chamber compartment 30 that retains its low pressure characteristics enhances the life of that device. Also, it is believed that cubic cell sections may be advantageously employed within the present invention. However, other cell section configurations may also be useful. Finally, the prior art single section trapping cells were of a solid construction with the trapping, excitation and detection plates being electrically insulated from each other. That construction is acceptable within the context of the present invention. However, FIG. 4 illustrates an alternative plate construction wherein each plate (other than the conductance limit) may be formed of a perforated metal or metal mesh of high transparency, facilitating conduction of molecules into and out of each cell section. Clearly, the electrode 13 and conductance limit plate 14 of FIG. 1 must be solid, with the exception of the orifice 20, for maintenance of a pressure differential between the two chamber compartments 30 and 31. The conductance limit plate 14 may be of any suitable nonmagnetic material such as ceramic, stainless steel or copper. It is therefore to be understood that, within the scope of the appended claims, the invention may be practiced otherwise than is specifically described.

We claim:

1. In a mass spectrometer of the type having vacuum chamber means, means for maintaining molecular flow conditions within said chamber means, means for introducing a sample into said chamber means, means for ionizing a sample within said chamber means, means producing a magnetic field through said chamber means for inducing ion cyclotron resonance, trapping plate means within said chamber means for restricting ion movement along said magnetic field, means for selectively applying trapping potential to said trapping plate means, means for exciting ions restricted by said trapping plate means and means for detecting ion excitation, the improvement comprising conductance limit plate means dividing said vacuum chamber means into first and second compartments, said molecular flow conditions maintaining means comprising means for separately maintaining molecular flow conditions in each of said compartments and said conductance limit plate means comprising electrically conductive means connected to said means for selectively applying trapping potential and having orifice means positioned and configured to allow ion equilibration between said compartments while maintaining a pressure differential between said compartments.

2. The mass spectrometer of claim 1 wherein said sample introducing means comprise means operative within said first compartment only.

3. The mass spectrometer of claim 2 wherein said exciting means and said detecting means comprise means operative within said second compartment only.

4. The mass spectrometer of claim 3 wherein said exciting means and said detecting means comprise perforated metal electrode means.

5. The mass spectrometer of claim 2 wherein said exciting means and said detecting means comprise means independently operative within both of said first and second compartments.

6. The mass spectrometer of claim 5 wherein said exciting means and said detecting means comprise perforated metal electrode means.

7. The mass spectrometer of claim 2 wherein said ionizing means comprises means operative within said first compartment only.

8. The mass spectrometer of claim 2 wherein said ionizing means comprises means within said second chamber and operative within said first chamber.

9. The mass spectrometer of claim 1 wherein said exciting means and said detecting means comprise perforated metal electrode means.

10. The mass spectrometer of claim 1 wherein said trap plate means, exciting means, detecting means and conductance limit plate means define at least one cubic cell section means within said second compartment.

11. The mass spectrometer of claim 1 wherein said trap plate means, exciting means, detecting means and conductance limit plate means define cubic cell means in each of said first and second compartments.

12. The mass spectrometer of claim 1 wherein said trapping potential is positive.

13. The mass spectrometer of claim 1 wherein said trapping potential is negative.

14. The method of mass spectrtrometery comprising the steps of:

providing a magnetic field;

introducing a sample into a first high vacuum compartment in which molecular flow conditions are maintained, said first compartment being within said magnetic field;

forming ions of said sample within said magnetic field;

trapping said ions to restrict their movement along said magnetic field while allowing their movement along said magnetic field through an orifice for equilibration with a second high vacuum compartment in which molecular flow conditions are maintained, said orifice being positioned and configured to allow ion passage between said compartments while maintaining a pressure differential between said compartments;

trapping said ions to restrict their movement from said second compartment;

exciting ions trapped within said second compartment; and detecting ion excitation for sample analysis.

15. The mass spectrometry method of claim 4 further comprising the steps of:

quenching both chambers of ions; and repeating the method steps.

16. The mass spectrometry method of claim 14 further comprising the step of trapping said ions to restrict their movement from said first compartment.

17. The mass spectrometry method of claim 16 further comprising the steps of:

exciting ions trapped within said first compartment; and detecting ion excitation within said first compartment for sample analysis.

* * * * *

UNITED STATES PATENT AND TRADEMARK OFFICE
CERTIFICATE OF CORRECTION

PATENT NO. : 4,581,533

DATED : April 8, 1986

INVENTOR(S) : DUANE P. LITTLEJOHN ET AL

It is certified that error appears in the above-identified patent and that said Letters Patent is hereby corrected as shown below:

Column 7, line 7, "spectrtrometery" should be --spectrometry--.

Signed and Sealed this

*Twenty-sixth* Day of *August 1986*

[SEAL]

*Attest:*

DONALD J. QUIGG

*Attesting Officer* *Commissioner of Patents and Trademarks*